Sept. 30, 1941.  A. BOYNTON  2,257,101

THREADLESS DRILL PIPE

Filed June 30, 1939  2 Sheets-Sheet 1

Alexander Boynton, Inventor.

By Jesse L. Stone & Lister D. Clark

Attorneys.

Sept. 30, 1941.　　　A. BOYNTON　　　2,257,101

THREADLESS DRILL PIPE

Filed June 30, 1939　　　2 Sheets-Sheet 2

Alexander Boynton, Inventor,

By Jesse R. Stone
Lester D. Clark

Attorneys.

Patented Sept. 30, 1941

2,257,101

UNITED STATES PATENT OFFICE 2,257,101

THREADLESS DRILL PIPE

Alexander Boynton, San Antonio, Tex.

Application June 30, 1939, Serial No. 282,163

6 Claims. (Cl. 285—146)

My invention relates to drill pipe and means for connecting the joints together.

The principal object is to provide a connection means which will neither make up nor unscrew, regardless of the direction of rotation.

Another object is to provide connection means enabling the joints to be more quickly put together or taken apart than can be done with means now used.

Another object is to provide greater strength in the connections than can be accomplished with threads.

A further object is to distribute the stresses so as to greatly reduce crystallization of the metal in the connections.

The foregoing objects are accomplished by means of male and female coupling members, one member having helical keys adapted to register with helical slots of the other member. The female coupling member, in turn, has helical keys adapted to register with helical slots within an outer sleeve attached to and rotatable upon the male coupling member. Both sets of helical keys being engaged, the engagement is secured by a lock ring which is, in turn, secured by a snap ring; all of which will clearly appear from this specification and the mechanism illustrated in the accompanying drawings, in which—

Similar reference characters refer to similar parts throughout the several views.

Figure 1:
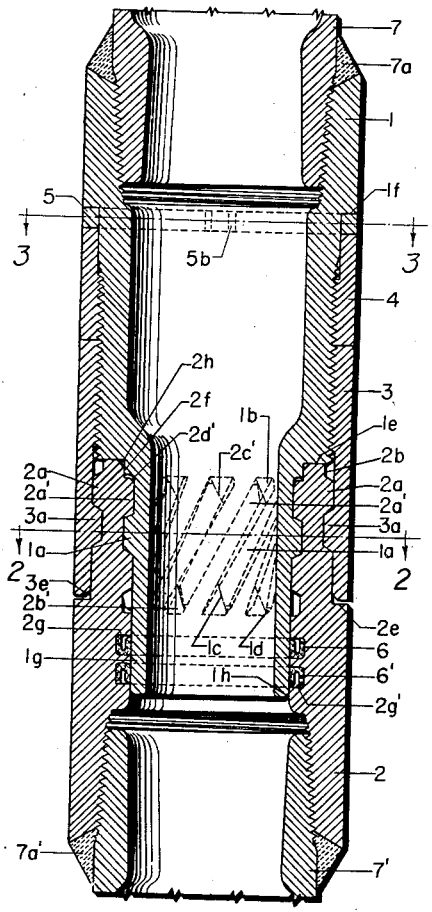
Fig. 1 is a longitudinal section through the preferred embodiment of the invention.
Figure 2:
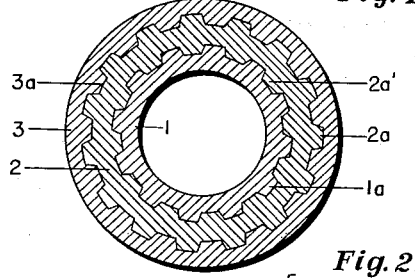
Fig. 2 is a cross section on the line 2—2, Fig. 1.
Figure 3:
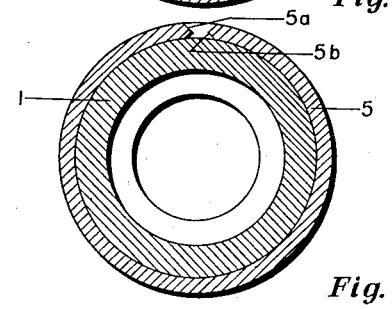
Fig. 3 is a cross section on the line 3—3, Fig. 1.
Figure 4:
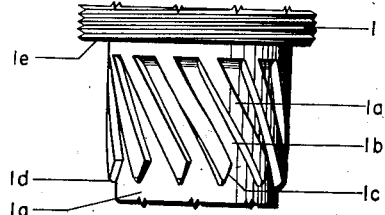
Fig. 4 is an outside view of the lower extremity of the upper coupling in Fig. 1.
Figure 5:
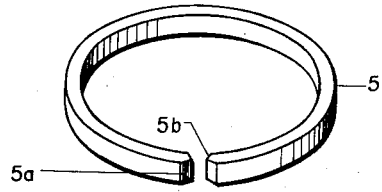
Fig. 5 is an isometric view of the snap ring in Fig. 1.
Figure 6:
Fig. 6 is a longitudinal section of the lock ring in Fig. 1.
Figure 8:
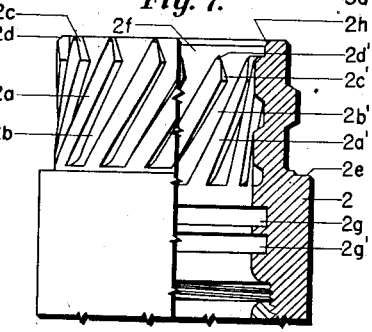
Fig. 8 is a partial outside view and partial longitudinal section of the lower coupling in Fig. 1.

With particular reference to Fig. 1, the upper coupling member 1 has external helical slots 1b forming the keys 1a, Fig. 4, adapted to be received within the internal helical slots 2b', forming the keys 2a', Fig. 8.

Figure 7:
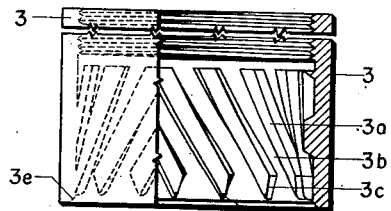
Fig. 7 is a partial outside view and partial longitudinal section through the sleeve in Fig. 1.

The sleeve 3, Fig. 7, having threaded engagement over the member 1, has internal helical slots 3b forming the keys 3a adapted to be received within the external helical slots 2b forming the keys 2a, Fig. 8.

The lower extremity of the upper coupling member 1, below the keys 1a, is formed into a tubular portion 1g, having a smooth exterior surface closely slidable within the central bore below the keys 2a' of the member 2.

The U cups 6 and 6' received within the annular recesses 2g and 2g', respectively (see Fig. 8), are adapted to prevent leakage of well fluid into or out of the drill pipe. The upper cup 6, looking upward, is adapted to expand and prevent well fluid from entering the drill pipe through the slight clearance between the keys and slots. The lower U cup 6', looking downward, is adapted to expand and prevent the leakage of fluid out of the drill pipe, as is apparent in Fig. 1. Manifestly, these U cups should be formed of some tough, pliable substance, such as leather or fabric. It is also apparent that any other suitable form of packing may be employed.

Preferably there should be slight clearance, such as the thickness of a penny, between the external shoulder 2e, and the lower extremity of the member 3, in order that the annular shoulder 1e may land securely upon the upper end of the member 2. This slight clearance will always indicate that the sleeve 3 is in the correct position for the snap ring 5 to be closely received around the member 1, between the external shoulder 1f and the upper end of the lock ring 4, when this ring, having threaded engagement over the member 1, is engaged upon the member 3, as is plainly shown in Fig. 1.

In order to assemble the device, as illustrated in Fig. 1, the U cups being in place as shown, the member 1, having a lower tubular extension

*1g* slidable through the U cups and within the central bore through the member 2, is inserted within the member 2. Before being so inserted, the sleeve 3 and the lock ring 4 are threadedly engaged over the member *1* and positioned approximately one-fifth of a turn upward from their position in Fig. 1. It is assumed, for illustration, that the helical keys *3a* are all of the same length and pitch and that they each incline a distance equal to approximately one-fifth the circumference of the sleeve 3.

The bevels *1c* of the keys *1a* and the bevels *2c'* of the keys *2a'* provided a sharp wedge end for each of these keys in order to facilitate assembling by preventing the keys from impinging upon their proximate ends immediately before these keys engage. Likewise, the bevels *2c* of the keys *2a* and *3c* of the keys *3a* prevent these keys from impinging upon their proximate ends. The bevels *1h* in Fig. 1; *1d*, Fig. 4; *2h*, *2d*, and *2d'*, Fig. 8; and *3e* and *3d*, Fig. 7; further facilitate assembling by avoiding extreme accuracy in stabbing the parts.

It will be noted that the external keys *2a* extend to the upper end of the member 2 while the internal keys *2a'* have the counterbore *2f* above them. This counterbore provides that the external keys *2a* will begin to engage between their mating keys *3a* before the keys *1a* and *2a'* begin to mate.

It will be observed that the inner sets of mating keys *1a* and *2a'* are inclined at the same pitch in one direction; while the outer set of mating keys *2a* and *3a* are inclined at the same angle in the opposite direction.

Manifestly, the mating keys must incline at the same angle, but the two sets of mating keys need not necessarily incline at the same angle. That is to say, the keys *1a* and *2a'* must incline at the same angle, while the keys *2a* and *3a* may incline at a different angle from that of the keys *1a* and *2a'*.

The member 2 is assumed to be held stationary while the members 1 and 3, assembled as stated, are let down upon it. During the engaging operation, the member 1 and one or more attached joints of the drill pipe 7 will rotate to engage the helical keys *1a* within the helical slots *2b'*, between the helical keys *2a'*; while the sleeve 3, at the same time, will rotate in the opposite direction to engage its helical keys *3a* between the helical keys *2a*. During this rotation, equivalent to approximately one-fifth of a turn (that being the assumed pitch of the keys), the sleeve 3, of course, will return to the position shown in Fig. 1. The lock ring 4 then may be rotated into engagement with the sleeve 3, and the snap ring 5 placed in the recess between the shoulder *1f* and the ring 4. The snap ring, having only slight clearance, such as two or three thousandths inch between the shoulder *1f* and the lock ring 4, will prevent the lock ring from becoming loosened and backing away from the sleeve 3, due to the vibration of the drill stem in service.

It will be observed that the snap ring has two bevels of equal pitch, the inner bevel *5b* being for engagement with a special tool for placing and removing it. The outer bevel *5a* is much longer than the inner one in order that the friction and pressure of mud engaging with the ring during rotation of the drill stem will act more to compress the ring, and thereby keep it in place, rather than to expand it.

It is apparent that the lock ring 4 may be omitted and the snap ring alone employed to close the space between the upper end of the sleeve 3 and the shoulder *1f*, that shoulder then being moved downward closer to the sleeve 3, in order that the snap ring will have proper dimensions for convenient manipulation.

To take the device apart, remove the snap ring 5, and, for convenience, leave it gripped around the member 1 proximately above the shoulder *1f*, back up the lock ring 4, and raise the member 1 which will reverse the assembling movements previously described.

It will be noted that the assembling and taking apart operations each may be made almost instantaneous, because the sleeve 3 is automatic in its rotation to engage or disengage the keys *2a* and *3a*; while a slight turn of the lock ring 4 will secure the assembly or provide for its disconnection, as the case may be.

By means of a special tool, the snap ring may be almost instantly moved up above the shoulder *1f*, from which upper position, around the member 1, it may be pressed downward to assume the position shown in Fig. 1.

Figure 9:
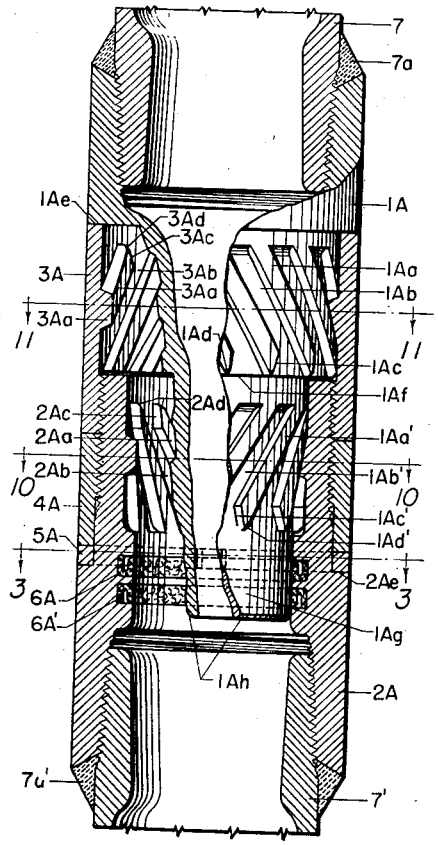
Fig. 9 is a longitudinal section of a modified form of the invention, with the upper coupling, shown partially in outside view and partly broken away.
Figure 10:
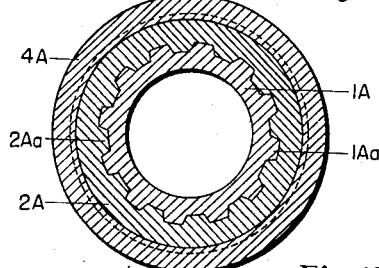
Fig. 10 is a cross section on the line 10—10, Fig. 9.
Figure 11:
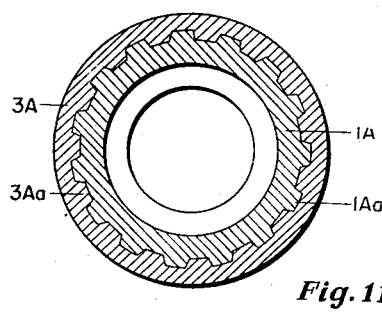
Fig. 11 is a cross section on the line 11—11, Fig. 9.

The modification illustrated in Figs. 9 to 11 is similar to the construction illustrated in Fig. 1, which it duplicates part for part, except that the parts 4A, 5A, 6A, and 6A' are identical in construction and purpose with the parts 4, 5, 6, and 6', respectively, in Fig. 1, but their position in the assembly is somewhat different.

The upper coupling member 1A has a double set of outside helical keys. The lower set *1Aa'*, having guide slopes *1Ac'* and *1Ad'*, is adapted to be closely engaged between the helical keys *2Aa*, having guide slopes *2Ac* and *2Ad* of the lower coupling member 2A; and the upper set *1Aa* formed between the helical slots *1Ab*, having guide slopes *1Ac* and *1Ad*, is adapted to be engaged within the helical slots *3Ab* between the helical keys *3Aa*, having guide slopes *3Ac* and *3Ad*, of the sleeve 3A, which has threaded engagement over the member 2A.

The upper drill pipe joint 7 may have threaded connection with the upper member 1A which engagement is secured by the weld *7a*, and the lower member 2A may have threaded engagement with the lower drill pipe joint 7' and further secured by the weld *7a'*.

Before assembling the device as shown in Fig. 9, it will be assumed that the lower member 2A is held stationary. The U cups 6A and 6A' being in place within the member 2A and in contact with the tubular extension *1Ag* of the member 1A, slidable within the central bore of the member 2A, as shown; the snap ring 5A being engaged around the member 2A just below the shoulder *2Ae*, and the lock ring 4A and the sleeve 3A being sufficiently rotated upon their mating threads in the direction of the shoulder *2Ae* from the position shown in Fig. 9; then, to assemble as in Fig. 9, insert the member 1A until the annular external shoulder *1Af* engages upon the upper end of the member 2A.

The helical keys *1Aa'* then will be engaged with their mating keys *2Aa* (see Fig. 10), and the helical keys *1Aa* will be engaged, at the same time, with their mating keys *3Aa* (see Fig. 11), the bevels *1Ah* and the slopes and bevels on the key ends serving for speed and convenience in making the assembly.

When the connection is completed, as in Fig. 9, there should be slight clearance between the lower shoulder *1Af* and the upper end of the member 2A, in order that the external shoulder 1Ae may be then engaged upon the upper end of the member 3A.

While the keys are engaging, the member 1A will rotate approximately one-fifth of a turn in one direction, while the sleeve 3A will rotate in the opposite direction, it being assumed that the pitch of the keys 3Aa is such as will cause the sleeve 3A to rotate approximately one-fifth of a turn while its keys are mating.

The sleeve 3A, being now turned back to the position shown in Fig. 9 by the keys 1Aa in the act of assembling, the lock ring 4A may be tightened upon it and the snap ring 5A pushed upward until it snaps into the annular recess between the lock ring and the shoulder 2Ae.

As stated in connection with Fig. 1, the lock ring 4A may be omitted and the assembly secured by the snap ring 5A only.

Figure 12:
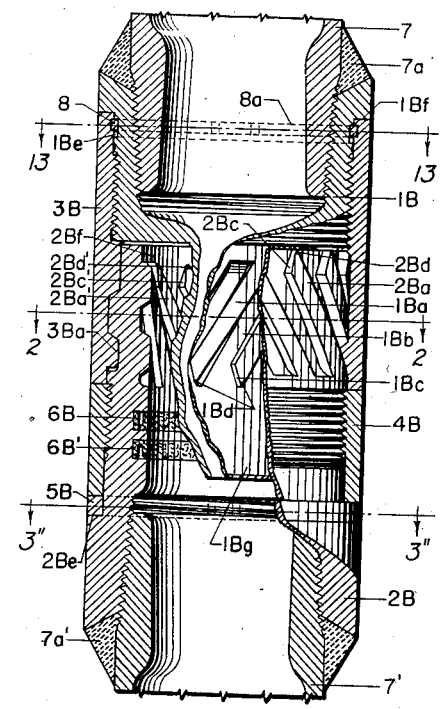
Fig. 12 is a longitudinal section through another modification of the invention, with the upper coupling shown partially in outside view and partly broken away and the lower coupling partially in outside view.

In Fig. 12, the parts 4B, 5B, 6B, and 6B' are the same in construction and purpose as the corresponding parts 4A, 5A, 6A, and 6A' in Fig. 9, the tubular extension 1Bg being slidable through the U cups and within the central bore through the lower portion of the member 2B.

Figure 14:
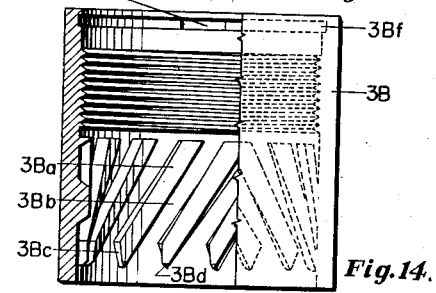
Fig. 14 is a longitudinal section through the sleeve in Fig. 12.

The helical keys 1Ba, having the end guide bevels and slopes 1Bc and 1Bd, are adapted to engage with their mating helical keys 2Ba', having the end guide slopes and bevels 2Bc' and 2Bd'; and the helical slots 3Bb forming the helical keys 3Ba, having the end guide slopes and bevels 3Bc and 3Bd, Fig. 14, are adapted to engage their mating helical keys 2Ba, having the end guide slopes and bevels 2Bc and 2Bd, Fig. 12.

Figure 13:
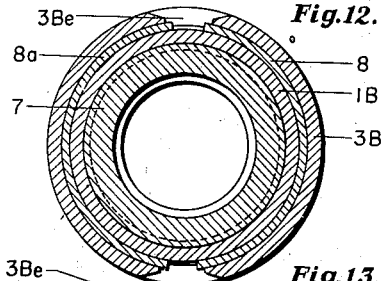
Fig. 13 is a cross section on the line 13—13, Fig. 12.

The member 3B has an internal annular recess 3Bf, Fig. 14, which closely receives the stop ring halves 8 and 8a. After the sleeve 3B is threadedly connected over the member 1B until it engages upon the external shoulder 1Bf, the stop ring halves 8 and 8a may be then pushed into place through the slots 3Be (see Fig. 13).

The member 1B has a small recess 1Be turned off above its external threads. This recess is adapted to receive the ring halves 8 and 8a to stop the downward travel of the member 3B away from the shoulder 1Bf.

Before beginning the assembly, it will be assumed that the lower coupling member 2B is held stationary. The snap ring 5B is assumed to be engaged around the member 2B proximately below the shoulder 2Be. The lock ring 4B is assumed to be slightly downward from its position in Fig. 12. The sleeve 3B is assumed to be somewhat downward from the shoulder 1Bf with the stop ring halves 8 and 8a engaged upon with the slight shoulder forming the lower end of the recess 1Be, and the keys 3Ba are assumed to have a pitch adapted to impart approximately one-fifth of a turn to the member 3B.

Now, to form the connection, lower the assembled members 1B and 3B to the position shown in Fig. 12, until the shoulder 1Bf lands upon the upper end of the member 3B. The lock ring 4B then will be turned upward into engagement with the sleeve 3B, and the snap ring 5B will be pushed upward until it snaps into the recess between the lock ring 4B and the shoulder 2Be.

The counterbore 2Bf above the keys 2Ba provides that the outer sets of keys will begin to mate sooner than the inner sets. Manifestly, either of the two sets of keys should begin to mate before the other set begins to mate, in order to divide the tendency of the keys to impinge upon their proximate ends all at one time, as they would tend to do if both sets of keys should begin mating at once.

It is apparent in all forms of the invention that the connection provides that the drill stem may be rotated clockwise or anti-clockwise without danger of becoming disconnected, and that keys of relatively small cross-sectional dimensions can be made of proper length to enable the drill stem to be twisted off or pulled in two without breaking the connection shown.

The drill pipe 7 and 7' may be threadedly joined to the upper and lower members of the device and further secured by the welds 7a and 7a' or the proximate upset extremities of the drill pipe may be fabricated into the upper and lower members.

In all forms of the invention, it will be observed that, in taking the device apart, the outer set of helical keys becomes dis-engaged while being rotated by the force that lifts the upper coupling member, and that in assembling the device, these keys become engaged when they are rotated in the opposite direction by the weight of the one or more joints of drill pipe above the upper coupling member when it is set down upon the lower one.

The scope and purpose of this invention as illustrated and described, is not intended to be limited to the drawings which will be understood as being diagrammatic only and set out by way of example to explain and clarify the stated objects and appended claims.

What I claim is:

1. A pipe connection of the character described comprising male and female members having complementary inclined keys to engage when the members are in interfitting relation, additional keys on one of said members, said additional keys being inclined oppositely to the first keys on said one member, a sleeve threaded throughout a portion of its length and threadably mounted upon the other of said members, said sleeve having keys on the unthreaded portion complementary to the additional keys, and means for locking said sleeve against rotation after the members are brought into interfitting relation.

2. A pipe connection of the character described comprising male and female pipe ends having complementary inclined keys to engage when the ends are in interfitting relation, said male end having exterior threads thereon a sleeve mounted upon said threads on the male end, complementary inclined keys upon the female end and the interior of said sleeve, the keys of said pairs of complementary keys being oppositely inclined, means for locking said sleeve against movement, said last mentioned means comprising a lock ring threaded to engage said exterior threads on the male end so that the lock ring is brought into engagement with the sleeve after the pipe ends are in interfitting relation.

3. A pipe connection of the character described comprising male and female pipe ends having complementary inclined keys to engage when the ends are in interfitting relation, a sleeve threadably mounted upon the male end, complementary inclined keys upon the exterior of the female end and the interior of the sleeve, the keys of said pairs of complementary keys being oppositely inclined, and a lock ring threadably mounted on the male end to lock said sleeve after the pipe ends are interfitted.

4. A pipe connection of the character described comprising male and female pipe ends having complementary inclined keys to engage when the ends are in interfitting relation, a sleeve threadably mounted upon the male end, complementary inclined keys upon the exterior of the female end and the interior of the sleeve, the keys of said pairs of complementary keys being oppositely inclined, a shoulder on the male end in spaced relation with the sleeve and a snap ring within the groove formed by the shoulder and the end of the sleeve.

5. A pipe connection of the character described comprising male and female pipe ends having complementary inclined keys to engage when the ends are in interfitting relation, a sleeve threadably mounted upon the male end, complementary inclined keys upon the exterior of the female end and the interior of the sleeve, the keys of said pairs of complementary keys being oppositely inclined, a lock ring threadably mounted on the male end, a shoulder on the male end in spaced relation with the lock ring, and a snap ring within the groove formed by the shoulder and the end of the lock ring.

6. A pipe connection comprising male and female members having complementary inclined keys in engagement, a sleeve threaded interiorly throughout a portion of its length and threadably mounted upon and extending outwardly from the female member, said sleeve having inclined keys on the inner surface thereof outwardly of said threaded portion, additional keys on the male member engaging the interior keys of the sleeve, and means for locking the sleeve against movement, after the members are interfit.

ALEXANDER BOYNTON.